(12) United States Patent
Hill (10) Patent No.: US 6,206,032 B1
(45) Date of Patent: Mar. 27, 2001

(54) HIGH PRESSURE CHECK VALVE FITTINGS

(76) Inventor: James H. Hill, P.O. Box 1287, Searcy, AR (US) 72143

(*) Notice: Subject to any disclaimer, the term of this patent is extended or adjusted under 35 U.S.C. 154(b) by 0 days.

(21) Appl. No.: 09/614,009

(22) Filed: Jul. 11, 2000

(51) Int. Cl.$^7$ .................................................. F16K 15/04
(52) U.S. Cl. ...................... 137/539.5; 137/539; 137/512; 184/105.3
(58) Field of Search ................................ 137/539, 539.5, 137/512; 184/105.3

(56) References Cited

U.S. PATENT DOCUMENTS

| | | | |
|---|---|---|---|
| 3,880,130 | * | 4/1975 | Hecht ............................. 137/539.5 X |
| 4,893,650 | * | 1/1990 | Chisholm et al. ............ 137/539.5 X |
| 4,977,927 | | 12/1990 | Hill . |
| 5,183,075 | * | 2/1993 | Stein ................................. 137/539 X |
| 5,425,397 | * | 6/1995 | Mackal ......................... 137/543.13 X |

* cited by examiner

*Primary Examiner*—Kevin Lee
(74) *Attorney, Agent, or Firm*—Stephen D. Carver (57) ABSTRACT

High pressure check valves and fittings, including button head fittings, sealant fittings, and lubrication adapters, that are equipped with dynamically self-centering plungers. Each metallic fitting comprises a fluid inlet and a fluid outlet. The inlet end of each may be configured to be mechanically engaged by high pressure hoses, grease guns, or the like. The outlet end is configured, as by threading, for coupling to the desired application. The inlet and outlet are in fluid flow communication, and meet at an internal valve seat. A steel ball forms the check valve element. The ball is dynamically controlled and centered by a dynamic plunger coaxially and slidably disposed in the fitting. A return spring coaxially mounted on the plunger normally urges the ball and the plunger towards the valve seat to close the fitting. A plunger crown is integral with an elongated, dual-diameter shaft. A conical depression in the crown seats the ball for centering. One end of the spring abuts the underside of the crown, and the opposite end is seated within a counterbore in a plunger guide. A reduced diameter portion of the plunger shaft coaxially registers within a centering passageway defined in the guide. Axial plunger displacement is limited when the shoulder contacts the guide counterbore floor. The plunger guide is axially secured by a snap ring seated within a ring groove formed in the outlet passageway. Portions of the guide are beveled to center and pressure the interior edge of the snap ring.

13 Claims, 11 Drawing Sheets

HIGH PRESSURE CHECK VALVE FITTINGS

BACKGROUND OF THE INVENTION

I. Field of the Invention

My invention relates generally to high pressure fittings and check valves. More particularly, the invention relates to high pressure check valves and grease fittings equipped with internal valve-centering structures for maintaining component alignment, and preventing internal structural deformation, when subject to extremely high operating pressure. Known prior art can be found in United States Patent Class 137, Subclass 539.

II. Description of the Prior Art

Numerous high pressure lubrication fittings and check valves exist in the art. Such fittings are common in heavy industrial equipment, construction vehicles, and oil and gas apparatus. These high pressure devices are known in the art as check-valves, sealant fittings, lubrication adapters, and button head fittings. They facilitate the injection of a variety of conventional and synthetic greases, lubricants and/or sealants, which are injected periodically during equipment maintenance. Their primary function is to accept and channel lubricants and/or sealants to the correct inner working parts of the apparatus upon which they are mounted. Heavy duty applications often involve pressures exceeding fifteen thousand (15,000) PSI. Typical high pressure grease fittings such as "button-head" fittings are widely used in the oil and gas industry. A button-head fitting allows the grease or injection gun to be securely fastened within the fitting inlet as lubricant is forcefully injected.

However, common button-head fittings and high pressure check valves suffer from numerous disadvantages. As explained in my prior U.S. Pat. No. 4,977,927, button-head fittings can internally deform in response to the injection of heavy sealants or lubricants. Some prior art fittings employ a "soft seat" formed by a steel ball which forcibly contacts a non-metallic element to form a one-way valve. Soft seats can wear out quickly when subjected to sustained pressures. At high pressures, the seat against which the valve ball presses can distort, resulting in leaks through the fitting. The apparatus on or in which the fittings may be used might have internal leakage. The causes for internal leakage are many and varied. Causes include accumulated wear on moving, mating parts, and damages from corrosive or abrasive gases or liquids. Some OEM designs are insufficient to prevent leakage. Whatever the cause, an important function of every pressure fitting is to prevent back pressure leakage through itself. It is a common practice to seal the leak paths by injecting lubricants containing bridging agents such as plastics, TFE fluorocarbons, etc. However, bridging agents cause other problems.

The injection of heavy bridging agents can bend or misalign conventional valve return springs, which are structurally located proximate the material flow path internally of the fitting. So-called "plug-off" or clogging can result, since the return spring forms a grease flow path through which at least a portion of the lubricants or sealants may normally flow. If the check valve ball over-compresses the return spring, the flow path may be impeded. Blocking or clogging raises the internal fluid pressure, and the spring may be permanently deformed as a result. Spring damage also results from "cylinderization," which can occur when the return spring is longitudinally compressed until its adjacent windings are squeezed together to form a cylinder-like tube. Cylinderization severely restricts grease outflow through the adjacent spring, windings, which should normally be spaced-apart.

Another problem relates to part misalignment. Over time, in response to high pressures and component wear, the check valve ball may reposition itself atop the compressed spring in an offset position. In this instance, the ball center is offset from the longitudinal axis of the return spring. As a result, injection pressures are not properly dissipated, and the valve does not seat optimally. Leaking is commonly the result. In cases of extreme wear or component deformation, dangerous "blow-out" can occur. In response, internal parts of the fitting may explode outwardly. Sometimes the damaged parts are forced into the attached equipment or pipeline. During the resultant down time they must be removed from the flow path, and the damaged fitting must be replaced. The blow-down process is time-consuming and expensive. Those skilled in the art will recognize a number of other problems experienced eventually by typical high pressure fittings.

U.S. Pat. No. 4,347,915 employs an offset spring "leg" to cause the ball member to drift to one side when the spring compresses. However, heavy sealants with large bridging agents cause the leg member to bend laterally, trapping the ball, and preventing it from reseating properly. Spring deformation can result.

U.S. Pat. Nos. 2,918,084 and 3,437,082 disclose a variety of spring, ball, and sleeve configurations.

The high pressure fitting disclosed in my prior U.S. Pat. No. 4,977,927 was designed to prevent spring deformation and cylinderization. A rigid retainer, generally in the form of a parallelepiped, is threadably received within the tubular fitting, outlet. A rigid, integral stem projecting from the retainer coaxially receives and mounts the valve spring, which normally biases the ball towards the valve seat.

However, my subsequent experiments have revealed that there is ample room for improvement. For example, despite the fact that longitudinal spring compression stops when the check valve ball contacts the projecting stem, lateral spring deformation can still occur with my prior design. Such deformation can result during assembly, when the threaded retainer is forcibly rotated. Further, retainer integrity is limited by its threaded design. Finally, after extreme use, dissected fittings reveal check valve ball misalignment. In other words, the valve balls have become slightly offset relative to the longitudinal axis of the spring and the projecting stem. As mentioned above, valve ball offsetting degrades check valve sealing.

It is also important to eliminate the cold working of metals. The term "cold working" refers to the physical deformation of metal at room temperature. For fittings adapted for non corrosive applications, the manufacturing process often involves the crimping or deforming of metal to capture or retain valve springs. Metals used for Sour Service are subject to sulfide stress cracking caused by hydrogen sulfide. Cold-worked parts are subject to stress cracking, and their use should be avoided. Unfortunately, many prior art designs include cold-worked parts.

Therefore, I have designed an improved high pressure fitting. Critical interior parts dynamically control the operative positions of the check-valve ball and the return spring. Dynamic ball centering occurs while an adequate flow path is preserved. The new system substantially attenuates spring deformation and cylinderization, while concurrently preventing valve offset. Dynamic interaction of the preferred parts, including a dynamic spring mounting system and a self-centering check valve ball seating arrangement, enhances fitting performance and durability. The new design increases component life, enhances fluid flow rates, and encourages leak-proof valve sealing.

SUMMARY OF THE INVENTION

The check valves or fittings described herein find application in a wide variety of high pressure valve devices, including button head fittings, sealant fittings, and lubrication adapters. Each of the fittings comprises a rigid, body comprising a first end forming a fluid inlet, and a spaced-apart remote end forming a fluid outlet. The inlet end of each embodiment may be configured to be mechanically engaged by high pressure hoses, grease guns, or the like. The outlet end is configured, as by threading, for coupling to the desired application. The inlet and outlet are in fluid flow communication with an internal passageway that extends through the device. In the best mode, the passageway comprises separate, axially aligned inlet and outlet passageways, each of which preferably comprises a circular cross section. To house the valve elements to be described, the outlet passageway is preferably of a larger diameter than the inlet passageway.

The inlet and outlet passageways meet at an internal junction that is conformed to form a valve seat. The valve seat results from an internally chamfer at the end of the inlet passageway. The preferred valve element is a steel ball. The ball is controlled by a dynamic plunger that is slidably disposed in the fitting. A return spring coaxially mounted upon the movable plunger normally urges the ball and the plunger towards the valve seat. The dynamic plunger, and the spring captivated thereupon, are preferably coaxially aligned with the fitting's inlet and outlet passageways.

The plunger comprises an upper crown that is integral with an elongated, dual-diameter shaft. The crown comprises a conical depression in which the valve ball is received and centered. Pressure from crown contact dynamically centers the ball relative to the plunger and the valve seat, despite the fact that the ball and the constraining plunger are axially displaceable within the fitting. The coiled return spring normally biases the ball towards the valve seat to yieldably maintain the check valve in a closed position. In response to predetermined fluid input pressure, the valve element is deflected against predetermined spring pressure to open the fitting for fluid flow. Fluid passes the check valve and traverses the outlet passageway to eventually reach the downstream application or device to which the fitting is secured.

One end of the spring abuts the underside of the plunger crown. The opposite end of the spring is concentrically seated within a supportive counterbore internally defined in a plunger guide. The plunger shaft comprises a relatively larger diameter portion for captivating the spring, an integral, reduced diameter terminal portion, and a rigid, intermediate, shoulder defined at the juncture of the dual diameters. A passageway through the plunger guide is penetrated by the smaller, terminal portion of the plunger shaft to promote internal alignment. Spring alignment is further enhanced by the tight fit of the spring around the plunger's larger diameter portion. Rearward plunger displacement is limited when the plunger shoulder contacts the counterbore floor.

Preferably the plunger guide is axially secured in the outlet passageway by a snap ring seated within a groove formed in the outlet passageway. The somewhat flat guide has an open end that coaxially secures and axially restrains both the return spring and the plunger. The opposite guide end is externally beveled or chamfered. Consequently, when the guide is pressed rearwardly within the outlet passageway, it abuts the interior edge of the snap ring. The chamfered guide edge thus tends to drive the snap ring into tighter engagement within the ring groove.

Rising fluid pressure at the inlet deflects the check valve ball, and moves it rearwardly along with the plunger. At this time the ball is centered upon the plunger crown, so when it returns to its normally closed position, centering forces are developed both at the valve seat, and at the plunger crown. As the spring compresses in response to plunger deflection, its interior is at all times penetrated and reinforced by the plunger shaft. At the same time, axial displacement of the plunger is limited by eventual contact between the shaft shoulder and the plunger guide counterbore floor. Concurrently, coaxial centering of the plunger and the spring, wrapped about it is maintained by registration within the guide counterbore, and by penetration of the spring guide passageway by the smaller diameter portion of the plunger shaft.

Thus an important object is to provide a check valve fitting or back check fitting of the character described that facilitates high-volume fluid flow.

Another fundamental object is to provide a fitting design of the character described that reliably works with diverse high pressure devices, such as oil and gas pipelines, pumping equipment, or accessory hardware.

Another object is to control the path of fluids flowing though the check valve and/or the fitting.

A similar object is to provide a fitting of the character described that cannot be internally blocked or jammed.

Yet another object is to prevent valve spring deformation or cylinderization.

A still further object is to provide an improved fitting or check valve that inherently preserves an unobstructed fluid flow path, which tends to minimize internal pressures.

A related object is to avoid component stresses that result from overpressure.

Another basic object is to provide a dynamically self centering check valve system for high pressure fittings.

Still another important object is to prevent offsetting of the crucial check valve element. It is a feature of my invention that the critical valve ball is inherently centered relative to the return spring to insure long lasting, leak-proof performance.

Another broad object is to provide an improved design of the character described for use with check valves, button fittings, diverse valves, high pressure pumps, flow actuators, and similar devices.

Yet another object is to avoid blowout and plugging.

Another important object is to avoid catastrophic valve failure.

Yet another major object is to promote a smooth, high-volume flow of sealants, lubricants, bridging agents and the like.

Still another object of my invention is to enhance spring control and valve alignment. It is a feature of the invention that a dynamic spring-control system is employed to minimize spring cylinderization and valve ball offset.

Still another object is to provide a dynamically stable, spring control system that prevents cylinderization and misalignment.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
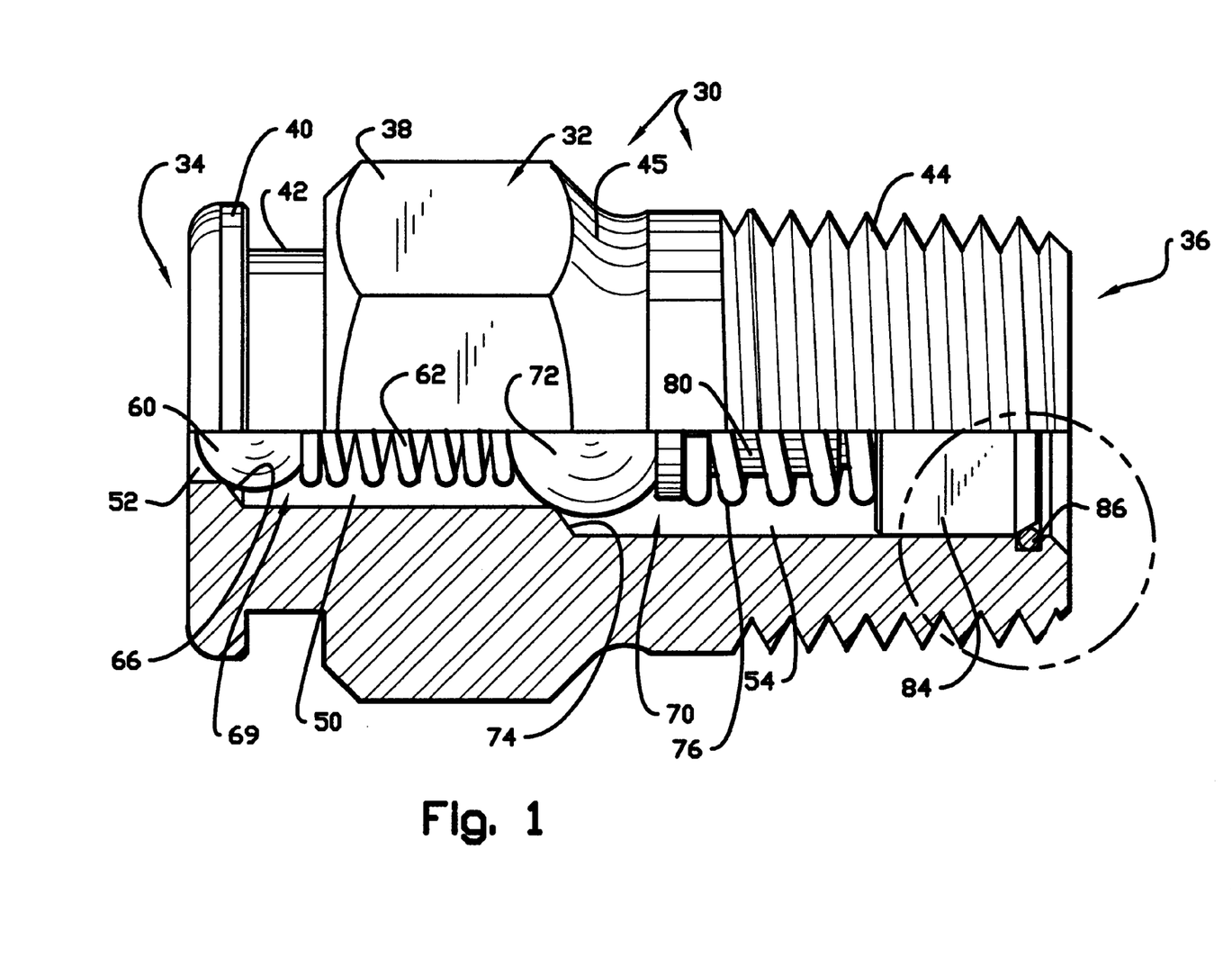
FIG. 1 is a fragmentary elevational view of an improved, high pressure button head fitting constructed in accordance with the best mode of my invention.
Figure 2:
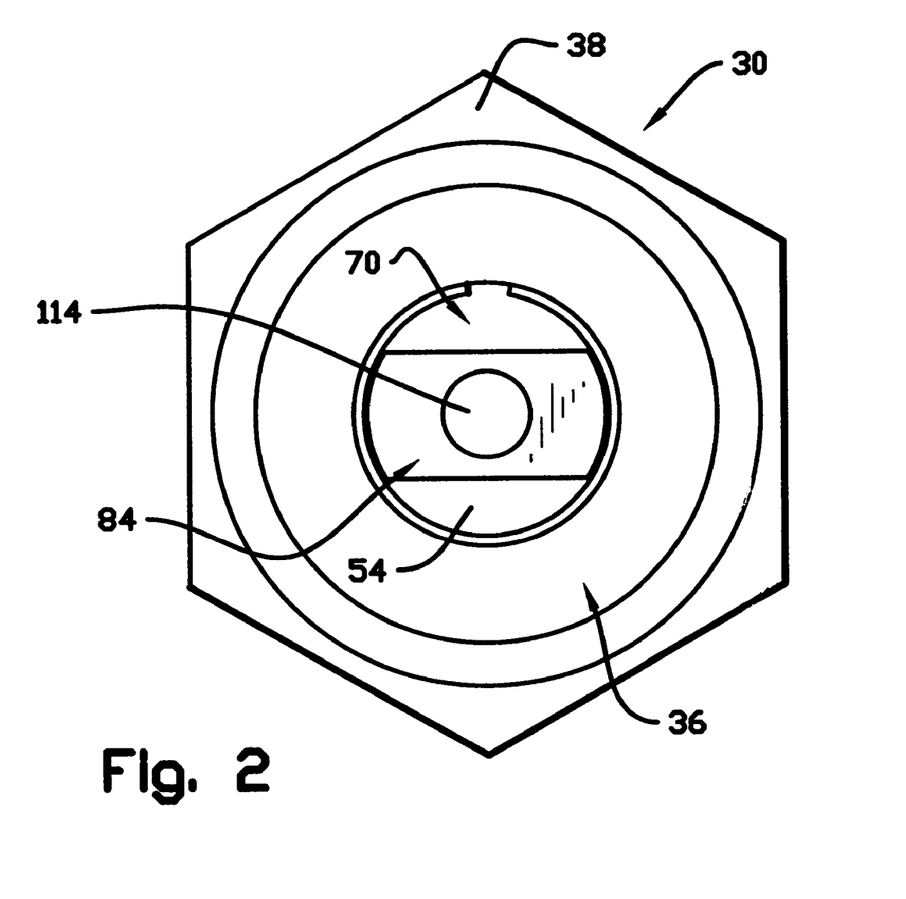
FIG. 2 is an end elevational view of the button head fitting taken generally from a position to the right of FIG. 1.
Figure 3:
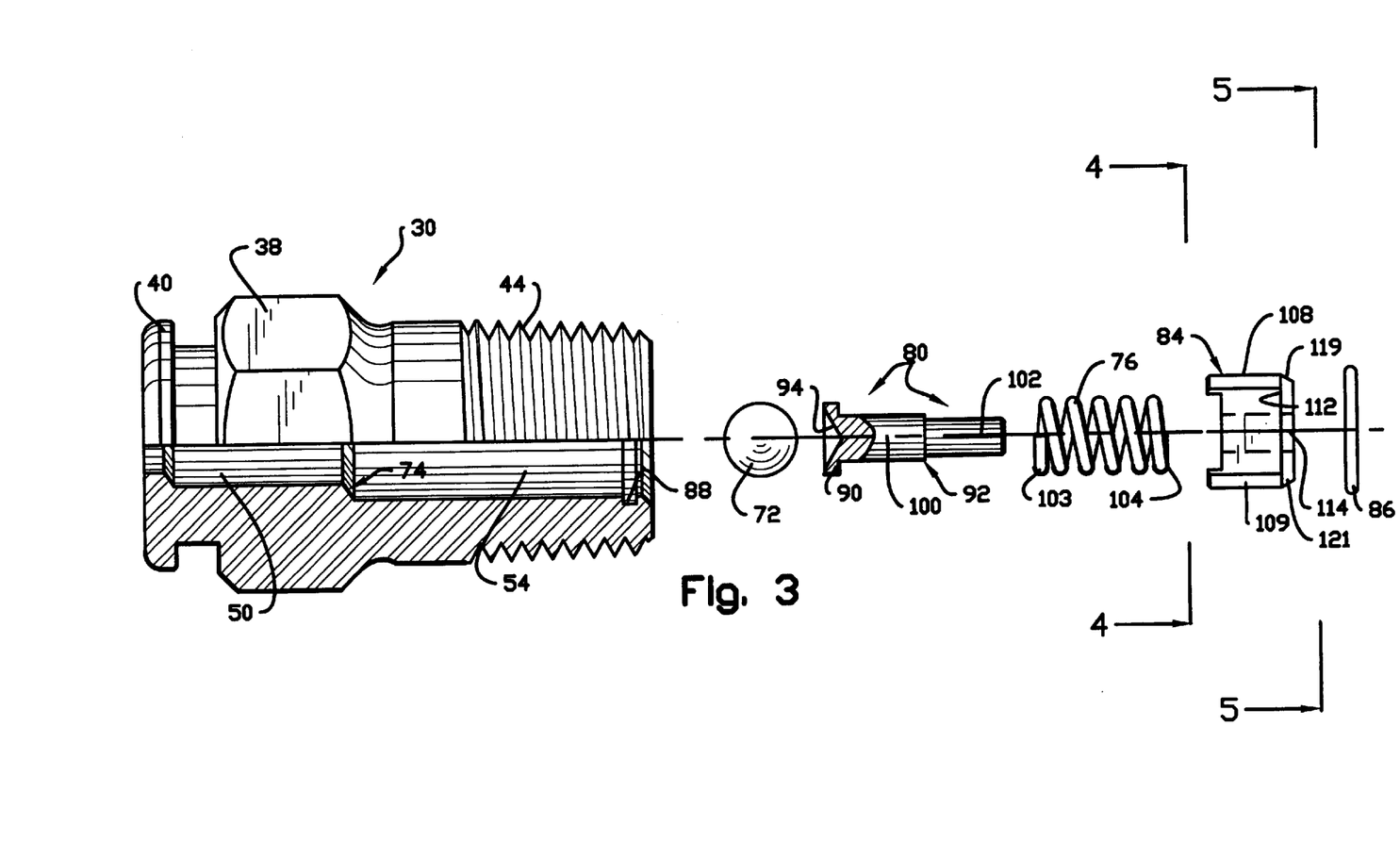
FIG. 3 is an enlarged, exploded elevational view of the button head fitting, with portions thereof broken away or shown in section for clarity.
Figure 9:
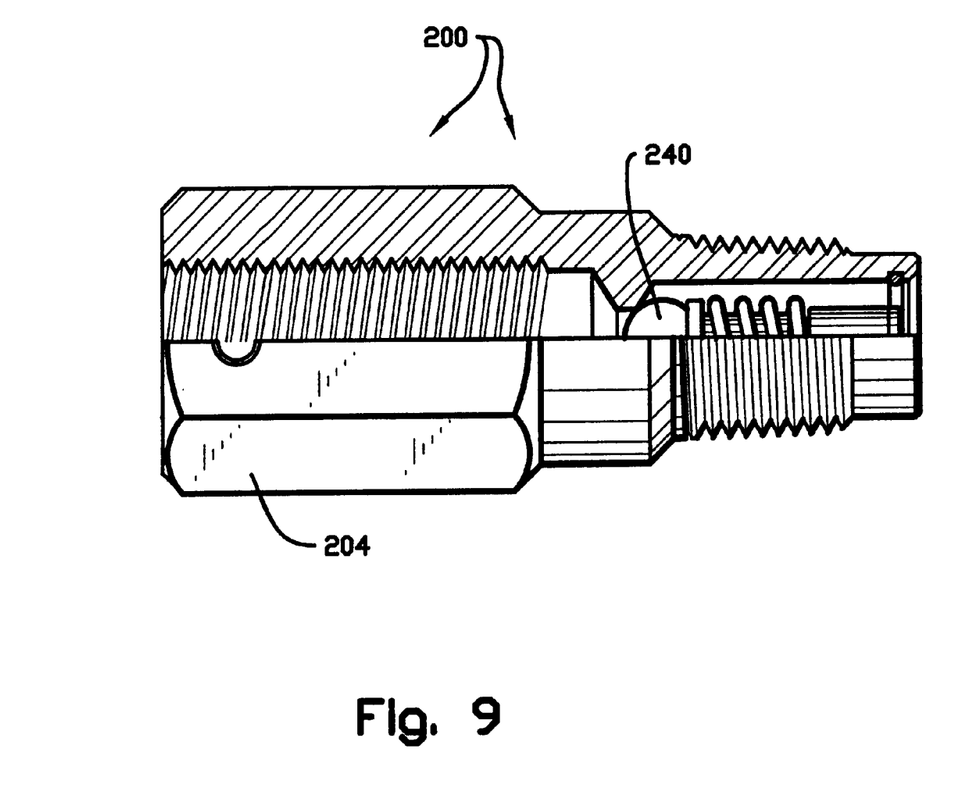
FIG. 9 is a fragmentary elevational view of an improved, high pressure sealant fitting constructed in accordance with the best mode of my invention.
Figure 10:
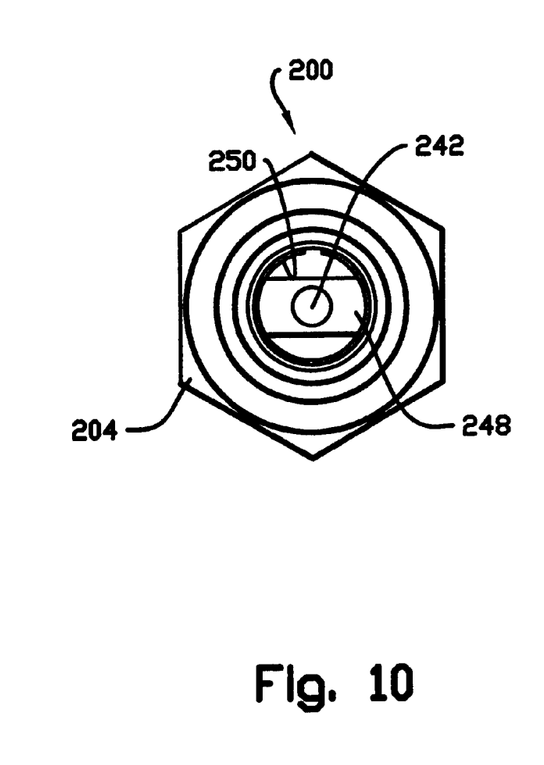
FIG. 10 is an end elevational view of the sealant fitting taken generally from a position to the right of FIG. 9.
Figure 11:
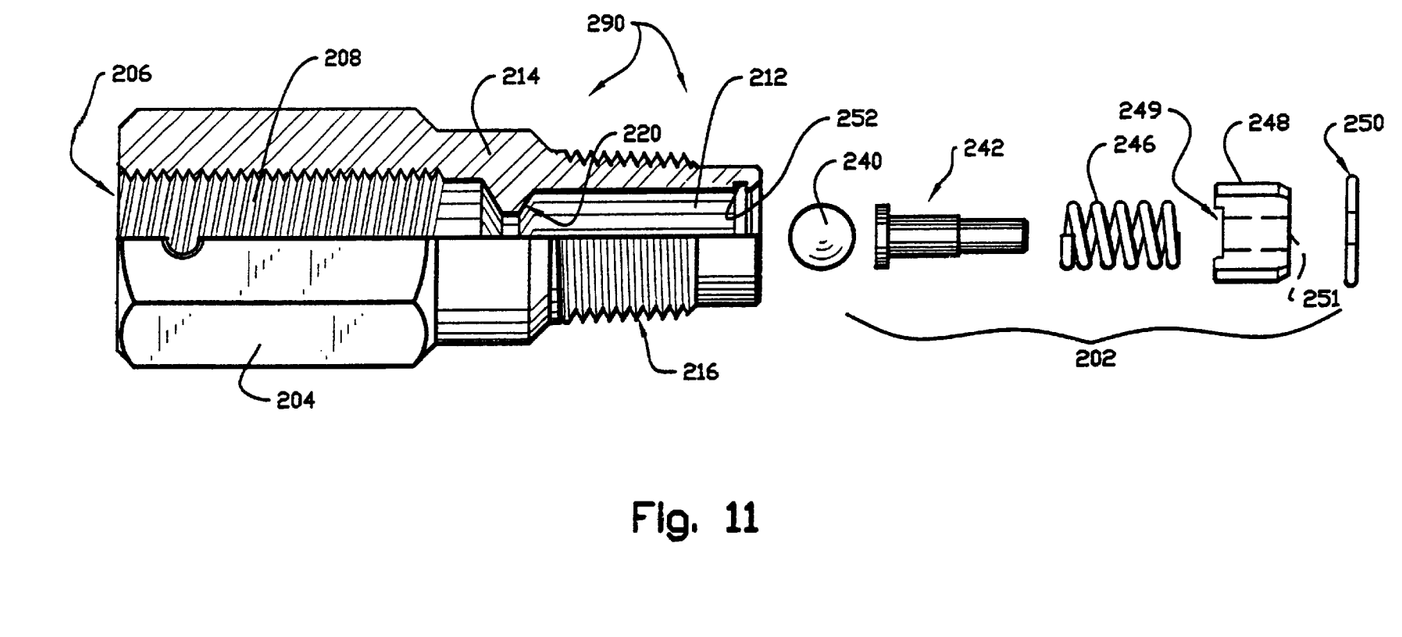
FIG. 11 is an enlarged, exploded elevational view of the sealant fitting of FIGS. 9 and 10, with portions thereof broken away or shown in section for clarity.

Turning now to the appended drawings, my new fitting functions as a high-pressure check valve in conjunction with various hardware adaptations. In FIGS. 1–3 for example, the invention functions as a button head fitting. In FIGS. 9–11 the invention provides a sealant fitting. The fitting of FIGS. 12–14 functions as a lubricant adapter. As used herein, the term "fitting" is intended to read on all of these device. The latter devices find application in diverse machines through various connections that require and/or enable periodic lubrication or treatment with a variety of greases, sealants, bridging agents, lubricants and the like. For example, the instant devices can be used with high pressure pumps and pipelines utilized in the oil and gas industry.

With initial reference directed to FIGS. 1–5, a giant button head fitting employing the concepts of my new invention has been (generally designated by the reference numeral 30. Fitting 30 is preferably formed of rigid metal, preferably alloy steels or stainless steel, with a conventional external configuration. The rigid body 32 is generally tubular, comprising an inlet end 34 and a spaced-apart outlet end 36 (FIG. 1). A larger diameter, hex body portion 38 enables manipulation with suitable wrenches. An integral button head flange 40 at the input end is separated from hex portion 38 by a reduced diameter neck 42. The rear body portion 44 is externally threaded for coupling to a conventional orifice as recognized by those skilled in the art. Threaded portion 44 is separated from hex portion 38 by integral, tapered collar 45 (FIG. 1).

An inlet passageway 50 is concentric with an inlet orifice 52 defined in the flange 40. A larger diameter outlet passageway 54 (FIG. 1) is concentric with inlet passageway 50. It is substantially defined within the portion of the fitting forming collar 45 and threaded portion 44. As recognized by those skilled in the art, button head fittings normally comprise twin, serially-connected check valves. The first internal check valve 69 (FIG. 1) is not critical. It comprises a steel ball 60 forming a valve element and an internal low pressure spring 62 captivated within passageway 50. Ball 60 is normally urged against valve seat 66 by low pressure spring 62, whose opposite end contacts ball 72. This provides a low pressure shield that essentially maintains a head of lubricant upon the critical high pressure check valve 70 (FIG. 1) that is constructed in accordance with any invention as hereinafter described.

Figure 7:
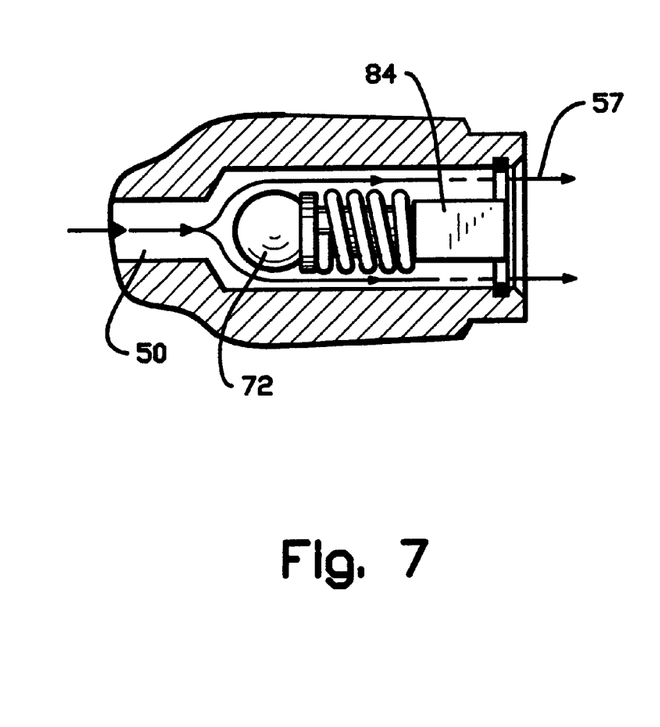
FIG. 7 is an enlarged, fragmentary diagrammatic view of the resultant flow path.

The larger steel ball 72 forms a critical check valve element in the high pressure check valve portion of the button head fitting. It is normally, yieldably biased towards an internal valve seat 74 (FIG. 1) by a coiled, return spring 76. Seat 74 is formed as a bevel at the junction between inlet passageway 50 and larger diameter outlet passageway 54. When fluid pressure is applied to the button head fitting, ball 60 initially retracts and compresses spring 62, which contacts ball 72. Eventually ball 72 deflects rearwardly against predetermined fluid pressure, unblocking passageway 50 (FIG. 7) and thereby enabling fluid passage. Fluid exiting outlet passageway 54 indicated by arrows 57 (FIG. 7) is delivered to the intended application.

The high pressure check valve 70 is subject to numerous, potentially damaging phenomena and/or forces discussed earlier. To accommodate these factors, numerous internal structural improvements have been incorporated in my present designs.

For example, return spring 76 is dynamically, coaxially mounted upon a movable plunger 80 (FIG. 3) coaxially disposed within outlet passageway 54. Plunger 80, and thus the spring 76, are in turn seated within a plunger guide 84 (FIGS. 4A, 4B, 4C) coaxially mounted within outlet passageway 54. A ring groove 88 (FIGS. 1, 3, 6) concentrically machined into the outlet passageway seats a snap ring 86 that ultimately anchors plunger guide 84, and thus the plunger and the ball, within the fitting.

Figure 8:
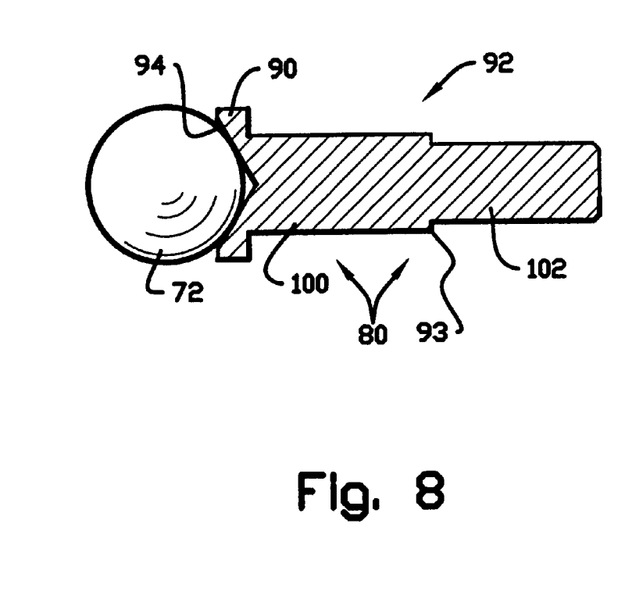
FIG. 8 is an enlarged, fragmentary diagrammatic view of the preferred ball centering arrangement.

The dynamic plunger 80 is secured coaxially within the fitting, and it is axially deflectable. Preferably plunger 80 comprises an upper crown 90 (FIGS. 3, 8) that is integral with an elongated shaft 92. Crown 90 comprises an upper, preferably conical recess 94 in which the steel valve ball 72 is seated. The ball naturally centers itself within generally conical recess 94 to maintain concentricity with shaft 92. Natural centering forces provided by the aforementioned crown recess dynamically align and center the ball within the apparatus. Scoring and deformation of valve seat edges is thus prevented when the ball is returned to the valve seat to close the fitting.

Importantly, plunger shaft 92 has a dual diameter. The larger main body portion 100 is integral with a lower diameter terminal shaft portion 102, with an intermediate shoulder 93 (FIG. 8) formed therebetween. Spring 76 coaxially surmounts shaft 92, primarily contacting larger diameter portion 100, about which it is tightly fitted and coaxially restrained. Spring deformation is thus resisted as the periphery of the spring is reinforced by the adjacent plunger shaft. Spring end 103 (FIG. 3) rests upon the underside of plunger crown 90. Spring end 104 extends to and is seated within the plunger guide 84 as explained hereinafter.

With emphasis upon FIGS. 3 and 4A–4C, the plunger guide 84 has a somewhat rectangular cross section, comprising sidewalls 108, 109 between its block-like body. Guide 84 coaxially fits within the check valve fitting, with curved sidewalls 108, 109 (FIG. 4A) firmly, flushly abutting the inner, peripheral surface of outlet passageway 54. The guide has a circular counterbore 111 for dynamically anchoring and controlling the return spring and plunger. Counterbore 111 terminates in an annular seat 112 (FIG. 4A) that is internally offset from guide shoulders 107. A coaxial passageway 114 is defined in guide 84 between sidewalls 108, and 109 (FIGS. 4B, 4C) and through spring seat 112. Smaller plunger shaft portion 102 coaxially registers within and slidably penetrates guide passageway 114. Because a portion of the plunger is registered within passageway 114, dynamic centering of the plunger is encouraged. Spring seat 112 is contacted by return spring end 104 to anchor the spring. When seat 112 is contacted by plunger shaft shoulder 93, plunger travel stops, and return spring 76 cannot be over-compressed. Thus, besides anchoring the return spring, guide 84 also limits plunger travel by contact between plunger shoulder 93 and spring seat 112. When the plunger is maximally deflected, its shoulder 93 contacts seat 112. Since plunger travel controls spring, compression, possible spring cylinderization is avoided. Further since both the plunger and the return spring coaxially engage the plunger counterbore 111, moving parts are dynamically centered and aligned. Spring alignment is further enhanced by the tight fit of the spring around the plunger shaft.

Figure 4A:
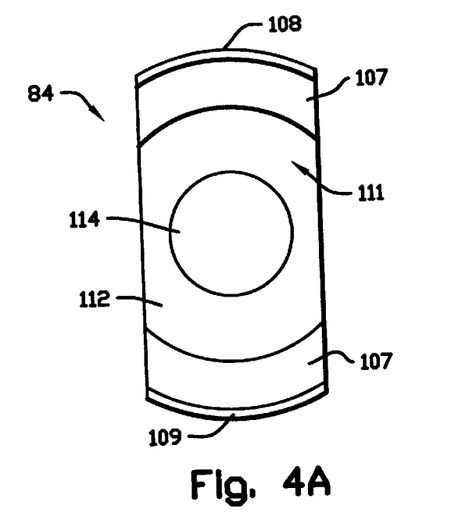
FIGS. 4A–4C are orthographic views of the preferred plunger guide.
Figure 4B:
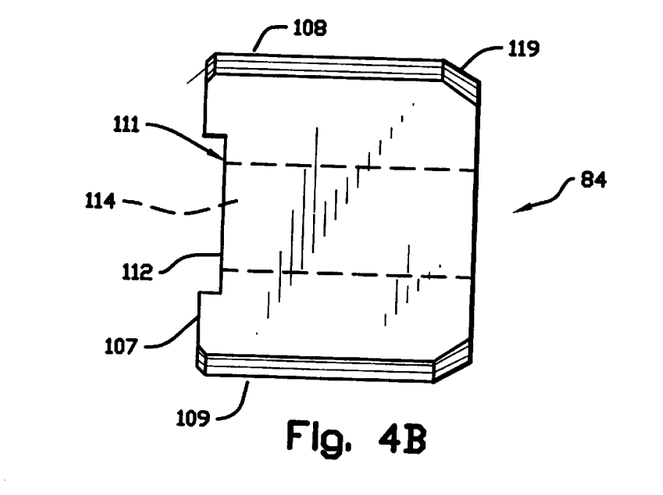
Figure 4C:
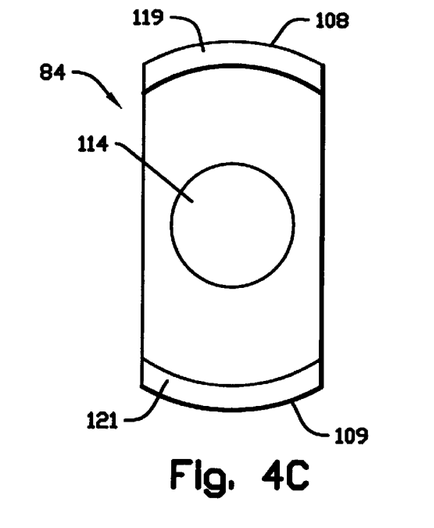
Figure 5:
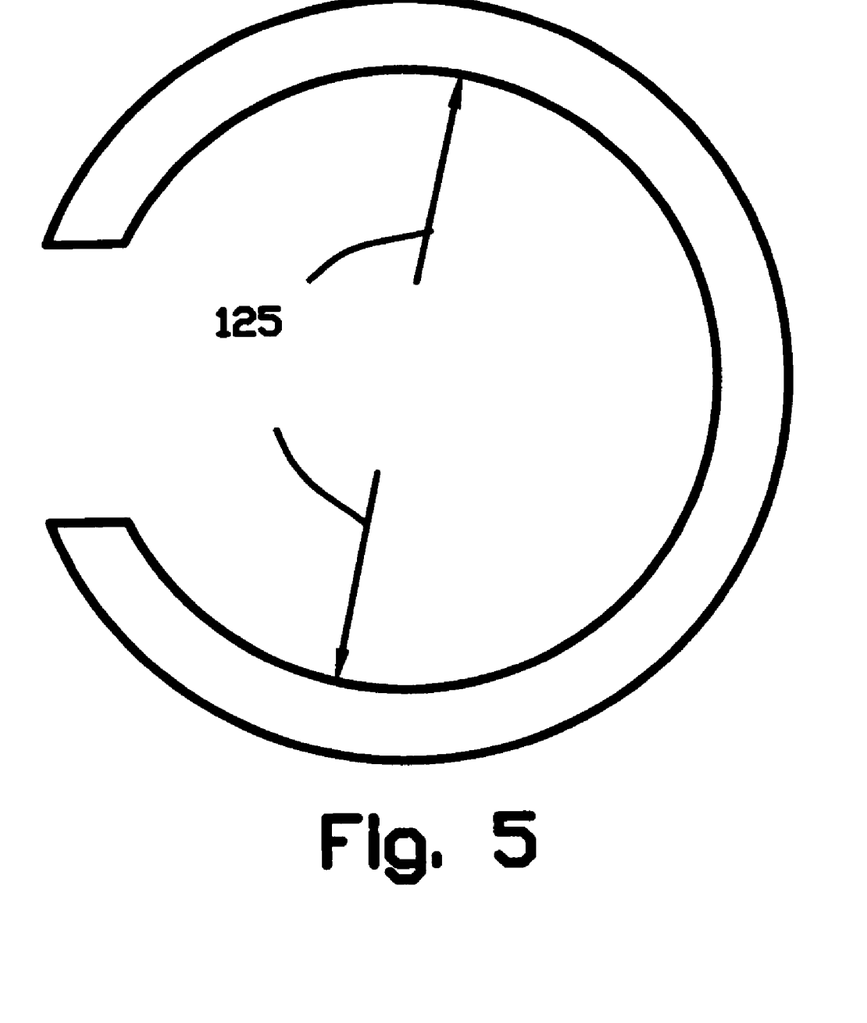
FIG. 5 is an enlarged plan view of the preferred retainer ring, taken generally along line 5—5 of FIG. 3.
Figure 6:
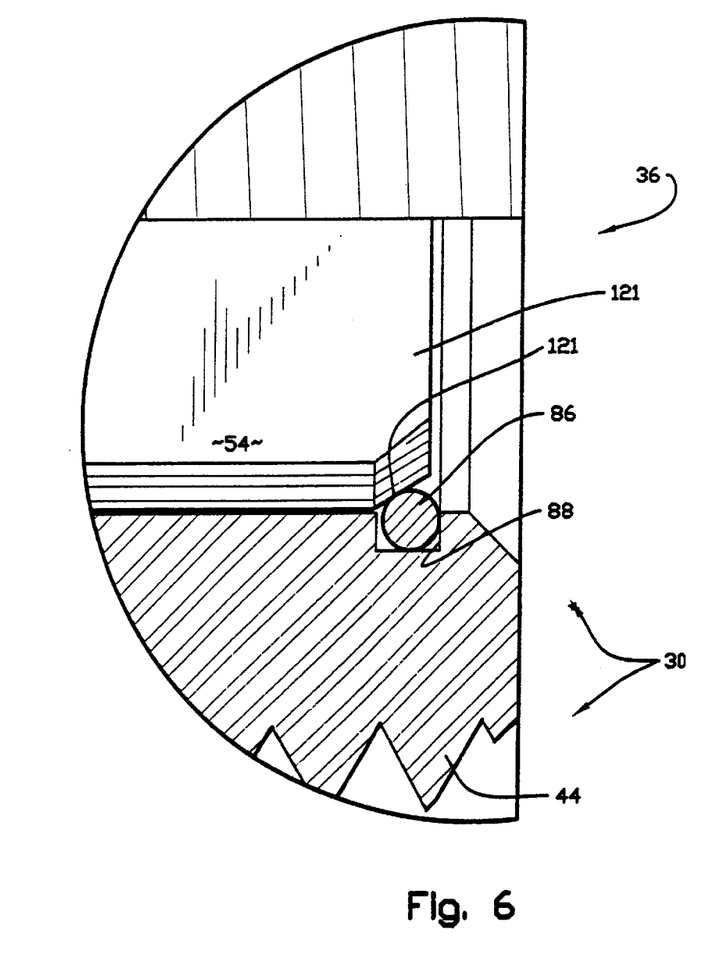
FIG. 6 is an enlarged, fragmentary sectional view of the end portion of the fitting shown in FIG. 1.

Guide 84 is axially secured in the outlet passageway by a snap ring 86 (FIGS. 3 and 5) seated within ring groove 88 (FIG. 6) formed in the outlet passageway 54. The rear ends 119, 121 (FIG. 4C) of guide sidewalls 108, 109 respectively are preferably beveled or chamfered (FIGS. 3, 4). In assembly these beveled ends 119, 121 internally contact and pressure the internal circular periphery of snap ring 86 (FIGS. 1, 6). This results in slight, radially outwardly directed pressure upon the inner periphery of the snap ring 86, as indicated generally by arrows 125 (FIG. 5). Thus rearward axial pressure upon guide 84 is transferred to snap ring 86, tending to maintain it firmly within ring groove 88. Further, when guide beveled ends 121, 119 contact the snap ring 86, centering or alignment of the assembly is encouraged.

Thus increased fluid pressure experienced by the inlet passageway 50 ultimately deflects the check valve ball 72, and the plunger 80, forcing them to the right (i.e., as viewed in FIG. 3), against predetermined pressure exerted by coaxially captivated spring 76. At this time the ball 72 remains centered upon crown 90, and cannot be displaced to an offset position that is misaligned relative to the inlet and outlet passages and the plunger axis. As the plunger retracts, it is centered by registration of smaller diameter shaft portion 102 within guide floor passageway 114, and internal alignment is further dynamically encouraged. As plunger deflection continues, spring end 103 is compressed towards spring end 104 that is seated upon seat 112 of guide 84. However, spring cylinderization cannot occur, because plunger shaft shoulder 93 forcibly contacts guide seat 112 first, axially limiting plunger displacement. Spring deformation during this critical time is further resisted by the plunger shaft, which coaxially penetrates the spring and supports it against lateral bending or other deformations.

When input pressure ceases, return spring 76 deflects the plunger and the check valve ball to the left (i.e., as viewed in FIG. 3) and ball 72 closes the valve against seat 74. During the return stroke, the plunger is centered by the guide 84. Ball 72 is concurrently centered upon plunger crown 90 within recess 94. When ball 72 is thrust against seat 74, further centering occurs. Seal damage is prevented by dynamically maintaining part alignment as aforesaid. In particular, the ball 72 is normally prevented from attacking the sides or edges of the valve seat 74 (FIG. 1) at an oblique angle, i.e., it cannot become offset from the center of the fitting. The low pressure check valve 69 is urged shut when spring 62 (FIG. 1) deflects and seats ball 60. After closing, an amount of grease or other lubricant is captivated between the two check valves, and the critical high pressure ball 72 is protected against unwanted corrosion.

Turning to FIGS. 9–11, a high pressure sealant fitting 200 constructed in accordance with the invention is illustrated. Fitting 200 includes a high pressure check valve arrangement 202 (FIG. 11) similar to that described earlier. Fittings 200 is preferably formed of rigid steel, comprising a hexagonal body portion 204 comprising an inlet end 206. The inlet passageway 208 is internally threaded, and it is in fluid flow communication with outlet passageway 212. The check valve assembly is disposed within passageway 212. An integral, reduced diameter neck 214 borders externally threaded attachment end 216. A valve seat 220 is formed at the junction of inlet passageway 208 and outlet passageway 212 (FIG. 11). Check valve assembly 202 comprises a ball 240, a dual diameter plunger 242, a return spring 246, and a plunger guide 248. Spring 246 seats within counterbore 249. The smaller diameter portion 241 of the plunger penetrates passageway 25 1. Snap-ring 250 is received within ring groove 252 to secure the check valve assembly 202. As before, the snap ring limits travel of the guide 248.

Figure 12:
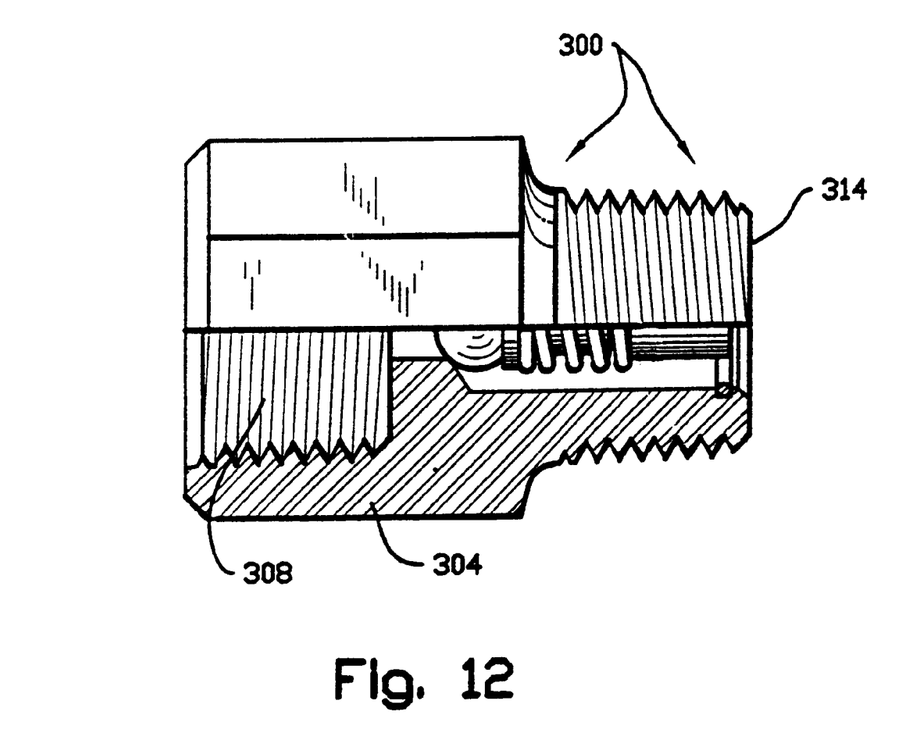
FIG. 12 is a fragmentary elevational view of an improved, high pressure lubrication adapter constructed in accordance with the best mode of my invention.
Figure 13:
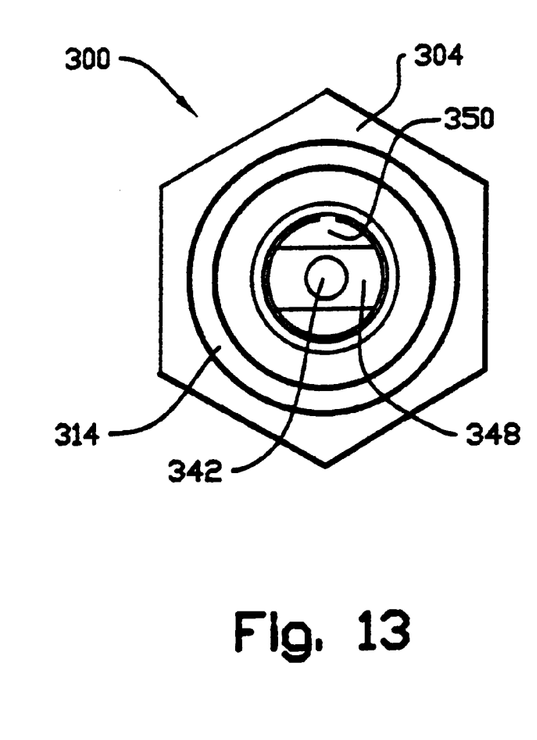
FIG. 13 is an end elevational view of the lubrication adapter taken generally from a position to the right of FIG. 12; and, FIG. 14 is an enlarged, exploded elevational view of the lubrication adapter of FIGS. 12 and 13, with portions thereof broken away or shown in section for clarity.
Figure 14:
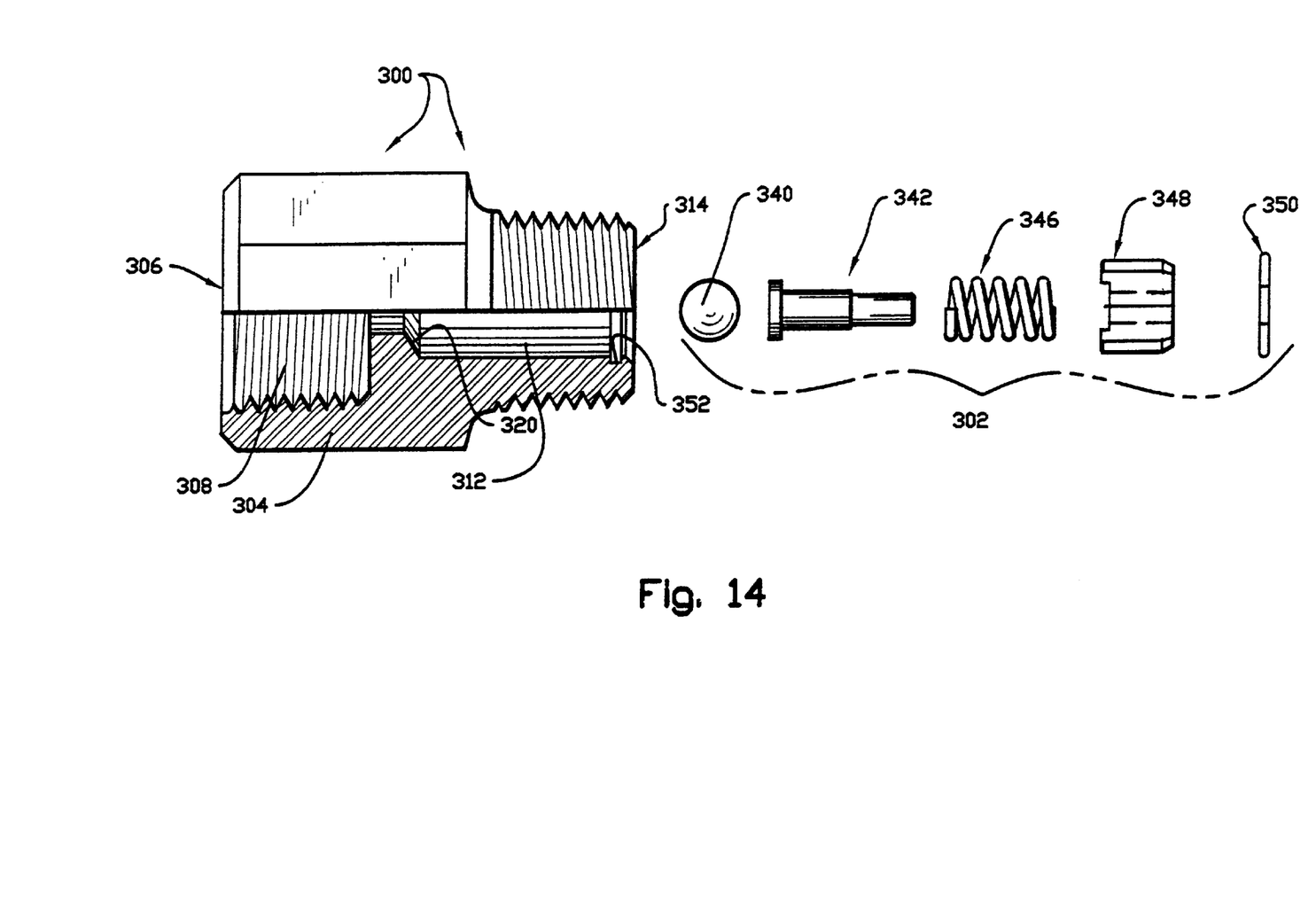

FIGS. 12–14 show a high pressure, steel lubrication adapter 300 that is quite similar to sealant fitting 200 discussed above. Fitting 300 includes a high pressure check valve arrangement 302 (FIG. 14) identical to those described earlier. Hexagonal body portion 304 comprises an internally threaded inlet end 306 comprising inlet passageway 308 that is in fluid flow communication with outlet passageway 312. The check valve assembly 302 is disposed within passageway 312. The integral, reduced diameter end 314 is externally threaded. A valve seat 320 is formed at the junction of inlet passageway 308 and outlet passageway 312 (FIG. 14). Check valve assembly 302 comprises a ball 340, a dual diameter plunger 342, a return spring 346 that seats within a counterbore in the plunger guide, and a plunger guide 348, all of which are similar to parts previously discussed in detail. Snap-ring 350 is fitted to ring groove 352 to secures the check valve assembly 302.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A high pressure fitting comprising:

an inlet passageway;

an outlet passageway;

a valve seat disposed interiorly of said fitting between said inlet passageway and said outlet passageway;

a displaceable plunger;

a valve element comprising a ball controlled by said plunger for selectively blocking said valve seat to close the fitting;

said displaceable plunger comprising a crown for seating and centering said ball and a shaft integral with said crown;

a return spring for normally yieldably biasing said plunger and said valve element ball towards said valve seat, said return spring coaxially captivated upon said plunger shaft; and, guide means within said outlet passageway for anchoring said return spring and controlling said plunger, said guide means comprising a counterbore for anchoring said return spring and a central passageway that registers with at least a portion of said plunger shaft.

2. The fitting as defined in claim 1 further comprising a conical recess defined in said crown for centering said ball.

3. The fitting as defined in claim 1 wherein said plunger comprises a dual diameter shaft integral with said crown and comprises a large diameter portion that coaxially mounts the return spring, an integral reduced diameter portion that penetrates said central passageway, and a shoulder defined between said reduced diameter portion and said large diameter portion that contacts said guide means to limit plunger travel.

4. The fitting as defined in claim 3 wherein said guide means is secured within said fitting by a snap ring, and said guide means comprises a beveled end contacting an inner periphery of said snap ring to promote centering.

5. A high pressure check valve for button fittings, sealant fittings, grease fittings, lubrication adapters, the check valve comprising:

an inlet passageway;

an outlet passageway;

a valve seat disposed interiorly of said fitting between said inlet passageway and said outlet passageway;

a ball for selectively blocking said valve seat to close the fitting;

a displaceable plunger comprising a crown having a recess for controlling said ball and an integral shaft, said shaft comprising a large diameter portion and a small diameter portion separated by a shoulder;

a return spring coaxially captivated upon said plunger shaft for normally yieldably biasing said plunger and thus said ball towards said valve seat; and, guide means within said outlet passageway for anchoring said return spring and controlling said plunger.

6. The fitting as defined in claim 5 wherein said guide means comprises a counterbore for seating said return spring, and a passageway that registers with said plunger shaft.

7. The fitting as defined in claim 6 wherein said plunger reduced diameter portion penetrates said guide means passageway, and said shoulder defined between said reduced diameter portion and said large diameter portion contacts said guide means to limit plunger travel.

8. The fitting as defined in claim 5 wherein said guide means is secured within said fitting by a snap ring, and said guide means comprises a beveled end contacting an inner periphery of said snap ring to promote centering.

9. A check valve system for a high pressure fittings comprising an inlet, and outlet, a valve seat disposed interiorly of said fitting between said inlet and said outlet, the valve system comprising:

a ball for selectively blocking said valve seat to close the fitting;

a displaceable plunger comprising a crown having a recess for controlling said ball and an integral shaft;

a return spring coaxially captivated upon said plunger shaft for normally yieldably biasing said plunger and thus said ball towards said valve seat; and, guide means within said outlet passageway for anchoring said return spring and controlling said plunger, said guide means comprising means for seating said return spring, and a passageway that slidably captivates at least a portion of said plunger shaft.

10. The system as defined in claim 9 wherein said shaft comprises a larger diameter portion captivating said spring, an integral smaller diameter portion penetrating said guide means passageway, and a shoulder between said larger and smaller diameter shaft portions.

11. The system as defined in claim 9 wherein said plunger comprises a dual diameter shaft integral with said crown, the shaft comprising a large diameter portion, a reduced diameter portion that penetrates said guide means passageway, and a shoulder defined between said reduced diameter portion and said large diameter portion that contacts said guide means to limit plunger travel.

12. The system as defined in claim 10 wherein said guide means is secured within said fitting by a snap ring, and said guide means comprises a beveled end contacting an inner periphery of said snap ring to promote centering.

13. The system as defined in claim 11 wherein said guide means is secured within said fitting by a snap ring, and said guide means comprises a beveled end contacting an inner periphery of said snap ring to promote centering.

* * * * *